(12) United States Patent
Kroizer et al.

(10) Patent No.: US 8,490,618 B2
(45) Date of Patent: Jul. 23, 2013

(54) SOLAR RECEIVER

(75) Inventors: Israel Kroizer, Jerusalem (IL); Gabriel Kaufmann, Beit Hananya (IL)

(73) Assignee: Brightsource Industries (Israel) Ltd., Jeruasalem (IL)

( * ) Notice: Subject to any disclaimer, the term of this patent is extended or adjusted under 35 U.S.C. 154(b) by 653 days.

(21) Appl. No.: 12/670,622

(22) PCT Filed: Jul. 28, 2008

(86) PCT No.: PCT/US2008/071366
§ 371 (c)(1),
(2), (4) Date: Jun. 2, 2010

(87) PCT Pub. No.: WO2009/015388
PCT Pub. Date: Jan. 29, 2009

(65) Prior Publication Data
US 2010/0252025 A1    Oct. 7, 2010

Related U.S. Application Data

(60) Provisional application No. 60/951,970, filed on Jul. 26, 2007.

(51) Int. Cl.
*F24J 2/24* (2006.01)
(52) U.S. Cl.
USPC ........... 126/600; 126/651; 126/571; 126/634; 126/684; 126/696
(58) Field of Classification Search
USPC ................. 126/600, 569, 571, 572, 573, 634, 126/684, 696; 60/641.8
See application file for complete search history.

(56) References Cited

U.S. PATENT DOCUMENTS

| | | | |
|---|---|---|---|
| 3,921,711 | A | 11/1975 | Westbrock |
| 4,015,584 | A | 4/1977 | Haberman |
| 4,055,948 | A | 11/1977 | Kraus et al. |
| 4,117,682 | A | 10/1978 | Smith |
| 4,119,083 | A | 10/1978 | Heyen et al. |
| 4,129,117 | A | 12/1978 | Harvey |

(Continued)

FOREIGN PATENT DOCUMENTS

| | | |
|---|---|---|
| DE | 2828118 | 1/1980 |
| DE | 10248068 | 5/2004 |

(Continued)

OTHER PUBLICATIONS

Paul et al., "Optimization of bed parameters for packed bed solar energy collection system," Renewable Energy, 2004, 29:pp. 1863-1876.

(Continued)

*Primary Examiner* — Alfred Bashichas
(74) *Attorney, Agent, or Firm* — Miles & Stockbridge P.C.; Mark A. Catan

(57) ABSTRACT

A solar energy conversion system may include a receiver with a first heat transfer fluid channel having at least two opposite sides. Each side may present an external surface facing in a direction opposite to that of the external surface of the other opposite side. Each side may be configured to contact a heat transfer fluid carried in the first heat transfer fluid channel. A heliostat field may be configured to direct solar energy to each of the at least two opposite sides during the course of a day such that a thermal stress tending to bend the channel remains below a specified level.

19 Claims, 8 Drawing Sheets

U.S. PATENT DOCUMENTS

| | | | |
|---|---|---|---|
| 4,132,217 A | 1/1979 | Rom et al. |
| 4,136,674 A | 1/1979 | Korr |
| 4,137,899 A | 2/1979 | Weslow |
| 4,164,123 A | 8/1979 | Smith |
| 4,190,037 A | 2/1980 | Niedermeyer |
| 4,197,830 A | 4/1980 | Wilson |
| 4,205,656 A | 6/1980 | Scarlata |
| 4,210,126 A | 7/1980 | Kellberg et al. |
| 4,215,673 A | 8/1980 | Cohen |
| 4,227,515 A | 10/1980 | Jacob et al. |
| 4,236,506 A | 12/1980 | Roark |
| 4,237,867 A | 12/1980 | Bauer |
| 4,239,035 A | 12/1980 | Brooks et al. |
| 4,244,354 A | 1/1981 | Williams |
| 4,245,618 A | 1/1981 | Wiener |
| 4,245,693 A | 1/1981 | Cheng |
| 4,262,653 A | 4/1981 | Holland |
| 4,273,101 A | 6/1981 | Merges |
| 4,289,114 A | 9/1981 | Zadiraka |
| 4,299,203 A | 11/1981 | Skopp |
| 4,303,061 A | 12/1981 | Torobin |
| 4,313,304 A | 2/1982 | Hunt |
| 4,314,549 A | 2/1982 | Swanson |
| 4,315,500 A | 2/1982 | Gonder |
| 4,320,246 A | 3/1982 | Russell |
| 4,324,230 A | 4/1982 | Lunsford |
| 4,333,445 A | 6/1982 | Lee |
| 4,338,919 A | 7/1982 | Hwang |
| 4,342,307 A | 8/1982 | Tuck |
| 4,355,627 A | 10/1982 | Scarlata |
| 4,394,859 A | 7/1983 | Drost |
| 4,397,304 A | 8/1983 | Villain |
| 4,401,106 A | 8/1983 | Binner |
| 4,416,257 A | 11/1983 | Bale |
| 4,418,685 A | 12/1983 | Frazier |
| 4,421,097 A | 12/1983 | Meckler |
| 4,421,102 A | 12/1983 | Posnansky et al. |
| 4,474,169 A | 10/1984 | Steutermann |
| 4,485,803 A | 12/1984 | Wiener |
| 4,488,539 A | 12/1984 | Lucassen |
| 4,512,336 A | 4/1985 | Wiener |
| 4,513,733 A | 4/1985 | Braun |
| 4,522,252 A | 6/1985 | Klaren |
| 4,523,576 A | 6/1985 | Waschow |
| 4,524,758 A | 6/1985 | Mori |
| 4,548,196 A | 10/1985 | Torobin |
| 4,593,754 A | 6/1986 | Holl |
| 4,601,282 A | 7/1986 | Mountain |
| 4,633,854 A | 1/1987 | Mayrhofer |
| 4,672,948 A | 6/1987 | Rosende |
| 4,676,068 A | 6/1987 | Funk |
| 4,727,930 A | 3/1988 | Bruckner et al. |
| 4,759,404 A | 7/1988 | Henson et al. |
| 4,848,087 A | 7/1989 | Parker et al. |
| 4,869,234 A | 9/1989 | Rapozo |
| 4,913,129 A | 4/1990 | Kelly et al. |
| 4,974,127 A | 11/1990 | Foley |
| 4,993,403 A | 2/1991 | Downs et al. |
| 5,500,054 A | 3/1996 | Goldstein |
| 5,572,987 A | 11/1996 | Moratalla et al. |
| 5,572,988 A | 11/1996 | Walton |
| 5,578,140 A | 11/1996 | Yogev et al. |
| 5,850,831 A | 12/1998 | Marko |
| 5,862,800 A | 1/1999 | Marko |
| 5,866,752 A | 2/1999 | Goozner |
| 5,894,836 A | 4/1999 | Wu et al. |
| 6,372,978 B1 | 4/2002 | Cifaldi |
| 6,442,937 B1 | 9/2002 | Stone et al. |
| 6,668,555 B1 | 12/2003 | Moriarty |
| 6,689,949 B2 | 2/2004 | Ortabasi |
| 6,689,950 B2 | 2/2004 | Cordaro |
| 6,698,501 B2 | 3/2004 | Fleischman |
| 6,722,358 B2 | 4/2004 | Rhodes |
| 6,776,154 B2 | 8/2004 | Yogev |
| 6,926,440 B2 | 8/2005 | Litwin |
| 6,931,851 B2 | 8/2005 | Litwin |
| 6,957,536 B2 | 10/2005 | Litwin et al. |
| 7,011,086 B2 | 3/2006 | Litwin |
| 7,191,597 B2 | 3/2007 | Goldman |
| 7,191,736 B2 | 3/2007 | Goldman |
| 7,331,178 B2 | 2/2008 | Goldman |
| 7,669,593 B2 | 3/2010 | Blackmon et al. |
| 7,690,377 B2 | 4/2010 | Goldman et al. |
| 8,033,110 B2 | 10/2011 | Gilon et al. |
| 8,063,349 B2 | 11/2011 | Huss et al. |
| 1,015,131 A1 | 1/2012 | Bone et al. |
| 2002/0197520 A1 | 12/2002 | Quick et al. |
| 2004/0086021 A1 | 5/2004 | Litwin |
| 2004/0139960 A1 | 7/2004 | Blackmon et al. |
| 2004/0144338 A1 | 7/2004 | Goldman |
| 2004/0244382 A1 | 12/2004 | Hagen et al. |
| 2005/0056313 A1 | 3/2005 | Hagen et al. |
| 2005/0126170 A1 | 6/2005 | Litwin |
| 2005/0279095 A1 | 12/2005 | Goldman |
| 2007/0012041 A1 | 1/2007 | Goldman |
| 2007/0084208 A1 | 4/2007 | Goldman |
| 2007/0137691 A1 | 6/2007 | Cobb et al. |
| 2007/0157614 A1 | 7/2007 | Goldman |
| 2007/0221208 A1 | 9/2007 | Goldman |
| 2008/0000436 A1 | 1/2008 | Goldman |
| 2008/0011290 A1 | 1/2008 | Goldman et al. |
| 2008/0078378 A1 | 4/2008 | Zhu |
| 2008/0209907 A1 | 9/2008 | Xiao et al. |
| 2008/0293132 A1 | 11/2008 | Goldman et al. |
| 2009/0155864 A1 | 6/2009 | Bauer et al. |
| 2009/0197322 A1 | 8/2009 | Goldman |
| 2009/0217921 A1 | 9/2009 | Gilon et al. |
| 2009/0229264 A1 | 9/2009 | Gilon et al. |
| 2009/0250052 A1 | 10/2009 | Gilon et al. |
| 2009/0322089 A1 | 12/2009 | Mills et al. |
| 2010/0006087 A1 | 1/2010 | Gilon et al. |
| 2010/0175738 A1 | 7/2010 | Huss et al. |
| 2010/0199977 A1 | 8/2010 | Plotkin et al. |
| 2010/0199978 A1 | 8/2010 | Plotkin et al. |
| 2010/0199979 A1 | 8/2010 | Plotkin et al. |
| 2010/0199980 A1 | 8/2010 | Ricci et al. |
| 2010/0236239 A1 | 9/2010 | Kroizer et al. |
| 2010/0258112 A1 | 10/2010 | Viskup et al. |
| 2010/0263709 A1 | 10/2010 | Norman et al. |
| 2011/0036343 A1 | 2/2011 | Kroyzer et al. |
| 2011/0114085 A1 | 5/2011 | Plotkin et al. |

FOREIGN PATENT DOCUMENTS

| | | |
|---|---|---|
| EP | 0041943 | 12/1981 |
| EP | 0106688 | 3/1985 |
| WO | WO 2008/118980 | 10/2008 |
| WO | WO 2008/128237 | 10/2008 |
| WO | WO 2008/154599 | 12/2008 |
| WO | WO 2009/015388 | 1/2009 |
| WO | WO 2009/055624 | 4/2009 |
| WO | WO 2009/103077 | 8/2009 |
| WO | WO 2010/093547 | 8/2010 |

OTHER PUBLICATIONS

"Central Receiver Systems" in: Stine, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

Slack et al., "Esolar Power Tower Performance Modeling and Experimental Validation," SolarPACES 2010 Conference, Sep. 21-24, 2010, Perpignan, France.

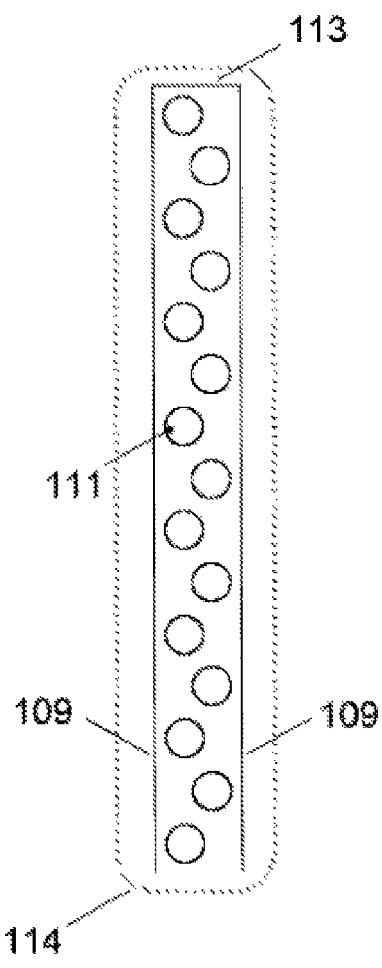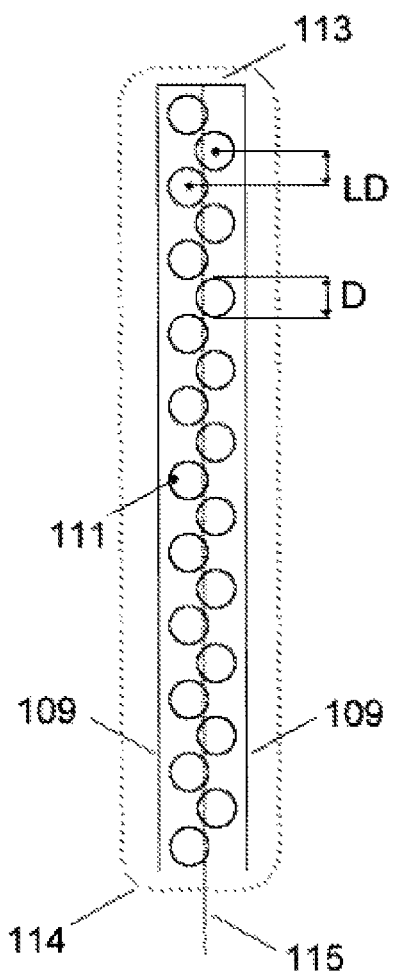

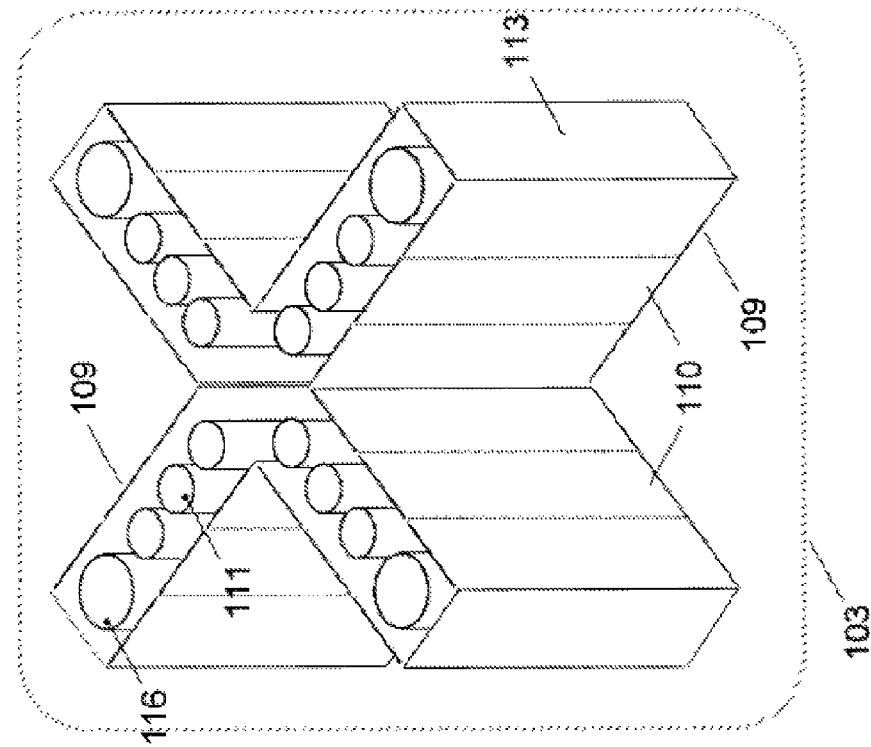
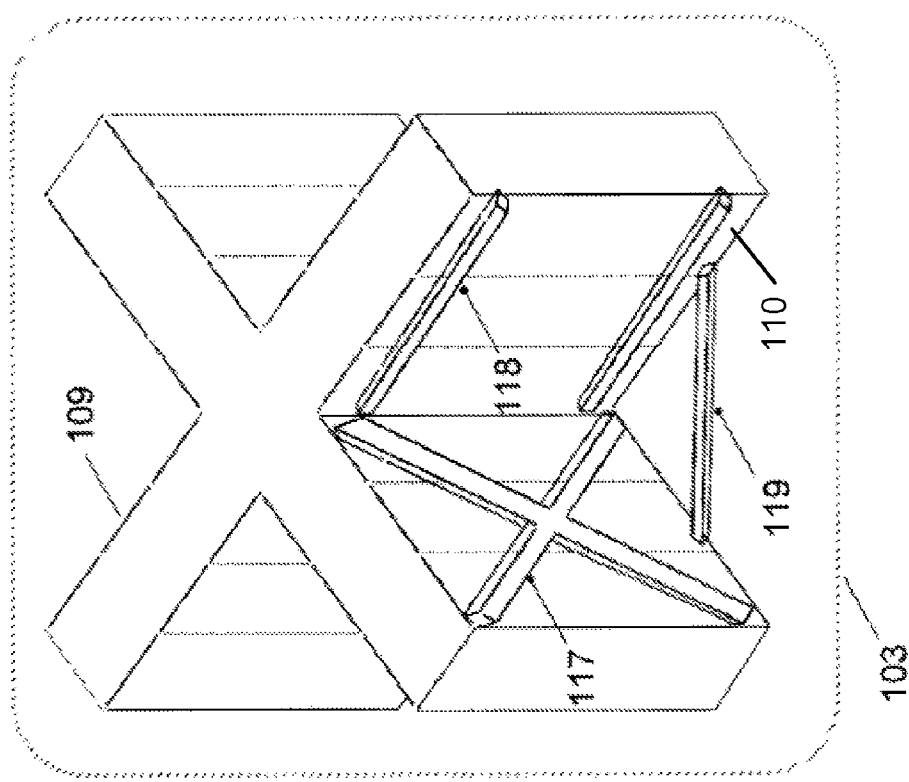

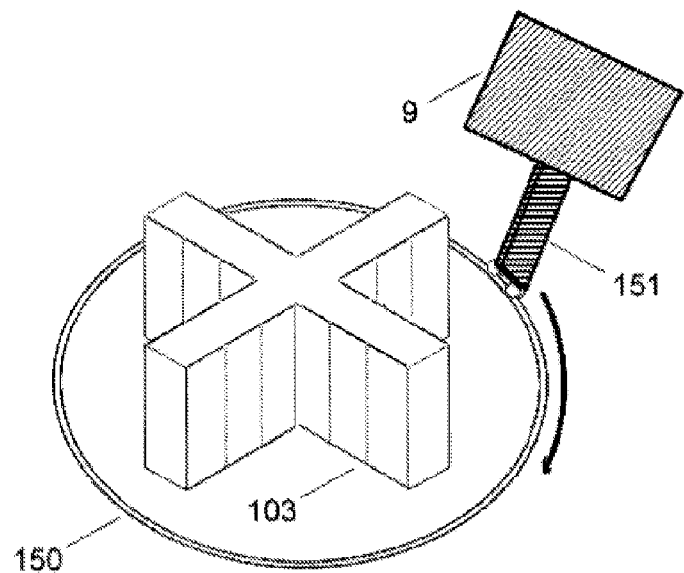
FIG. 14
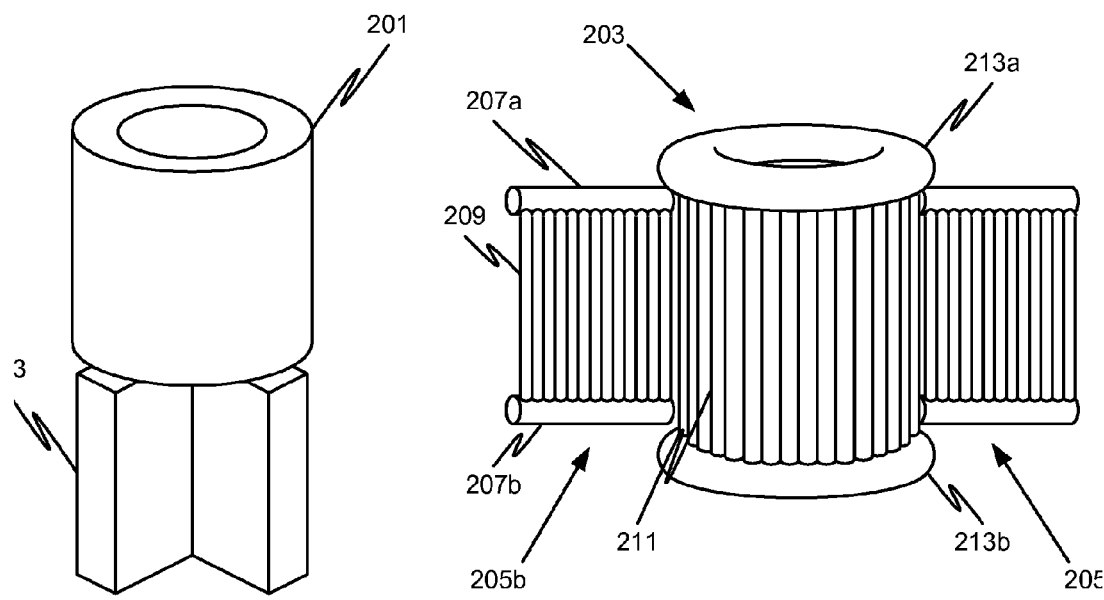
FIG. 15
FIG. 16

SOLAR RECEIVER

CROSS REFERENCE TO RELATED APPLICATIONS

This application is a U.S. national stage application of International Application No. PCT/US08/71366, filed Jul. 28, 2008, which claims the benefit of U.S. Provisional Patent Application No. 60/951,970, filed on Jul. 26, 2007, now expired, both of which are hereby incorporated by reference herein in their entireties.

FIELD OF THE INVENTION

This invention relates generally to the conversion of solar radiation to thermal energy, for example in a solar electric power system.

BACKGROUND

A known type of solar receiver has a cylindrical shape and is built of tube panels deployed around the circumference of the boiler. An example of such a receiver in the prior art is disclosed in U.S. Pat. No. 4,485,803. In a cylindrical solar receiver, solar heat flux is absorbed by the exterior panels and transferred therefrom to the tubes on the interior side of each panel. The exterior-facing half of each tube will thereupon become hotter than the interior-facing half of each tube. Because of this temperature differential, the tubes may be subject to excessive thermal stresses and/or bending that could lead to subsequent damage of the solar receiver or failure of the tubes.

Embodiments of the present invention may address the above-mentioned problems and limitations, among other things.

SUMMARY OF THE INVENTION

The invention provides an efficient system for the conversion of solar radiation to thermal energy and the creation of steam for powering a steam turbine electric power plant or the like, as well as components, articles of manufacture, and other technological improvements, and methods for using them.

In an embodiment of the present invention, a solar energy conversion system may include (i.e., comprise) a receiver with a first heat transfer fluid channel having (i.e., comprising) at least two opposite sides. Each opposite side may present an external surface facing in a direction opposite to that of the external surface of the other opposite side. Each opposite side may also be configured to contact a heat transfer fluid carried in the first heat transfer fluid channel. The solar energy conversion system may also include a heliostat field configured to direct solar energy to each of the at least two opposite sides during the course of a day such that a thermal stress tending to bend the channel toward either side remains below a specified level.

In an aspect, the receiver may have a plate-shaped element with the opposite sides being sides of the plate-shaped element. In yet another aspect, the receiver may have a bank of pipes forming a plate-shaped element with the opposite sides being sides of the pipes.

In another aspect, the receiver may have a second heat transfer fluid channel. The second heat transfer fluid channel may have an outwardly facing surface arranged so as to receive energy from the heliostat field and an inwardly facing surface arranged so as to face away from the heliostat field.

The first heat transfer channel may be one of multiple plate-shaped elements extending from the second heat transfer fluid channel. The first heat transfer fluid channel may be configured to operate at a higher temperature than the second heat transfer fluid channel.

In an embodiment of the present invention, a solar energy conversion system may include a receiver with first and second sets of pipes that convey heat transfer fluid. The first set may be interconnected for parallel flow of heat transfer fluid therethrough and to define a partially circular shape in a plan view. The second set may be interconnected for parallel flow of heat transfer fluid therethrough and to define plate-shaped structures with outwardly-facing opposite sides of each pipe. The solar energy conversion system may further include a heliostat field configured to direct solar energy to each of the opposite sides during the course of a day such that a thermal stress tending to bend the second set toward either of the opposite sides remains below a specified level.

In an aspect, the first set of pipes may have a header portion. The header may be mechanically connected to the second set of pipes to support the second set of pipes. In another aspect, the first set of pipes may have a steam separation drum portion.

In another embodiment of the present invention, a solar energy receiver may include a first receiver portion having a first configuration and a second receiver portion having a second configuration. The first configuration may include at least a partially circular section in plan view. The first receiver portion may be attached to the second receiver portion to provide support to the second receiver portion. The second configuration may include generally planar surfaces oppositely disposed and outwardly facing. The first and second receiver portions may be configured to convey separate heat transfer fluid flows that are fluidly isolated from each other.

In an aspect, the first receiver portion may have a piecewise cylindrical shape having a central axis. In another aspect, the first receiver portion may have a cylindrical shape having a central axis. The second receiver portion may include multiple segments that project from the first receiver portion in a radial direction with respect to the central axis. In yet another aspect, the second receiver portion may include three or four segments that project from the first receiver portion in a radial direction with respect to the central axis. In still another aspect, the second receiver portion may include three or four tube banks projecting from the first receiver portion in a radial direction with respect to the central axis.

In another aspect, the first and second portions may be fluidly coupled to respective header pipes. The respective header pipes may be mechanically connected such that the first receiver portion provides mechanical support to the second receiver portion. In another aspect, the first and second portions may be fluidly coupled to each other through a steam separation drum.

In yet another aspect, the first portion may be connected to a source of liquid which is conveyed thereby. The second portion may be connected to a source of steam which is conveyed thereby. In another aspect, the second portion may be adapted for the conveyance of steam while the first portion may be adapted for the conveyance of liquid. In still another aspect, the second portion may be adapted for the conveyance of a working fluid at higher temperatures than the first portion.

In still another aspect, the solar energy receiver may further include a third receiver portion having a third configuration. The third configuration may have generally planar surfaces oppositely disposed and outwardly facing. The first, second and third receiver portions may be configured to convey separate heat transfer fluid flows that are fluidly isolated from each other.

In another aspect, the second receiver portion may include a third receiver portion. The third receiver portion may be configured to convey a separate heat transfer fluid flow that is fluidly isolated from other heat transfer fluid flows of the second receiver portion. In another aspect, third receiver portion may be disposed farther from the first receiver portion than other portions of the second receiver portion. In another aspect, the third receiver portion may be configured to convey fluid at a lower pressure than other portions of the second receiver portion. In still another aspect, the third portion may be configured to convey steam extracted from a turbine with a reheat cycle.

In still another embodiment of the present invention, a solar energy receiver may include a plurality of tubes defining flat banks arranged such that light redirected by a heliostat field surrounding the receiver can be projected on opposite sides of each of the tubes.

In an aspect, the plurality of tubes may define flat blanks arranged in a star pattern, in plan view. In another aspect, the plurality of tubes may define flat panels arranged in a hub-and-spoke pattern, in plan view.

In a further aspect, the tubes may be parallel such that each of the flat banks defines a single column of the tubes.

In another aspect, the solar energy receiver may further include a receiver portion at the center of the star pattern defining a cylindrical portion with an outwardly facing surface. In still another aspect, the cylindrical portion may be coaxial with a center of the star pattern and arranged either above or below the star pattern.

In yet another embodiment of the present invention, a solar energy receiver may include a first receiver portion with a plurality of tubes defining flat banks arranged in a star pattern, in plan view, such that light redirected by a heliostat field surrounding the receiver can be projected on opposite sides of each of the tubes. The tubes may be parallel such that each of the flat banks defines a single column of the tubes. The solar receiver may also include a second receiver portion defining a cylindrical portion with an outwardly facing surface and being substantially coaxial with a center of the star pattern. The second receiver portion may operate at a lower temperature than the first receiver portion.

In an aspect, the first receiver portion may be located either above or below the second receiver portion.

In still another embodiment of the present invention, a solar energy receiver may include a first receiver portion having a first configuration and a second receiver portion having a second configuration. The first configuration may include at least one flat side in plan view. The first receiver portion may be attached to the second receiver portion to provide support to the second. The second configuration may include generally planar surfaces oppositely disposed and outwardly facing. The first and second receiver portions may be configured to convey separate heat transfer fluid flows that are fluidly isolated from each other.

In an aspect, the first receiver portion may have a piecewise polygonal shape having a central axis. In another aspect, the first receiver portion may have a square shape in plan view, having a central axis. The second receiver portion may include multiple segments that project from the first receiver portion in a radial direction with respect to the central axis.

Objects, advantages, and features of the present invention will become apparent from the following detailed description of the invention when considered in conjunction with the accompanying drawings.

BRIEF DESCRIPTION OF THE DRAWINGS

The accompanying drawings, which are incorporated herein and constitute part of this specification, illustrate exemplary embodiments of the invention, and, together with the general description given above and the detailed description given below serve to explain the features of the invention. Throughout the figures, like reference numerals denote like elements. The figures have not been drawn to scale.

FIGS. 6 and 7 are a cross-section view of an arm of a star-shaped solar receiver showing the interior arrangement of vertical tubes.

FIG. 8 is an oblique projection of a solar receiver showing examples of mechanical support elements.

FIG. 13 is an oblique projection of a solar receiver with horizontal cross-section showing interior arrangement of vertical superheating and reheating tubes.

FIG. 14 shows an oblique projection of a solar receiver with a secondary reflector.

FIG. 15 is an oblique projection of a solar receiver incorporating a drum-shaped receiver portion and a star-shaped receiver portion.

FIG. 16 is an elevation view of a panel-less solar receiver with a central drum-shaped receiver portion with arms radially projecting therefrom.

DETAILED DESCRIPTION OF THE INVENTION

The invention provides an efficient system for the conversion of solar radiation to thermal energy and the creation of steam for powering a steam turbine electric power plant or the like, as well as components, articles of manufacture, and other technological improvements, and methods for using them.

A solar receiver is a target for solar radiation reflected thereon by heliostats for the purpose of heating a fluid. The fluid is made to flow through a plurality of tubes or pipes in the receiver, which also includes conduits, pipelines, or the like, for providing ingress and egress to and from the receiver for the fluid.

The tubes may be positioned in a substantially vertical arrangement with multiple tubes conveying the fluid in parallel. Headers, manifolds and other piping arrangements may be provided to facilitate the transport of the fluid within the receiver and to and from the ingress and egress pipes. The receiver can be operated in the manner of a once-through boiler or alternatively in the manner of a multiple-pass boiler.

In alternative embodiments the tubes may be arranged so as to provide a serpentine path for the fluid.

The solar receiver may be located where reflected and optionally concentrated solar radiation impinges on exterior panels or other exterior surfaces of the receiver which are proximate to tubes on at least two sides of each tube.

The receiver may include a single row of tubes with exterior panels substantially parallel to the row on two sides of the row, such that each tube is proximate to a panel on two sides, and the tubes at each end may be proximate to exterior panels on three sides.

Figure 1:
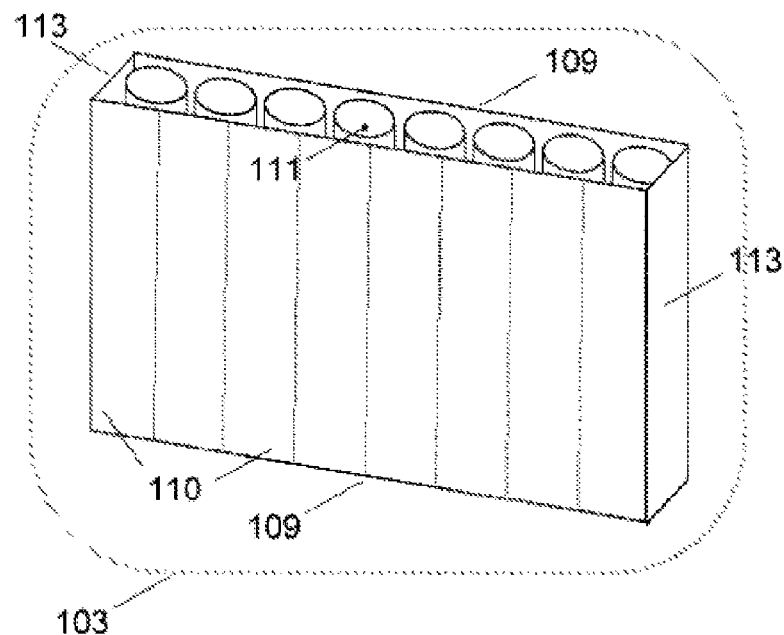
FIGS. 1, 2, 3 and 4 are oblique projections of solar receivers with horizontal cross-section showing interior arrangement of vertical tubes.

Referring now to the figures and in particular to FIG. 1, a receiver 103 is shown to include a single row of tubes 111 which are provided in proximity to and between two substantially parallel external surfaces 109, each surface 109 optionally comprising a plurality of panels 110. Additional external surfaces 113 are optionally provided in proximity to the endmost tubes in the row.

Figure 2:
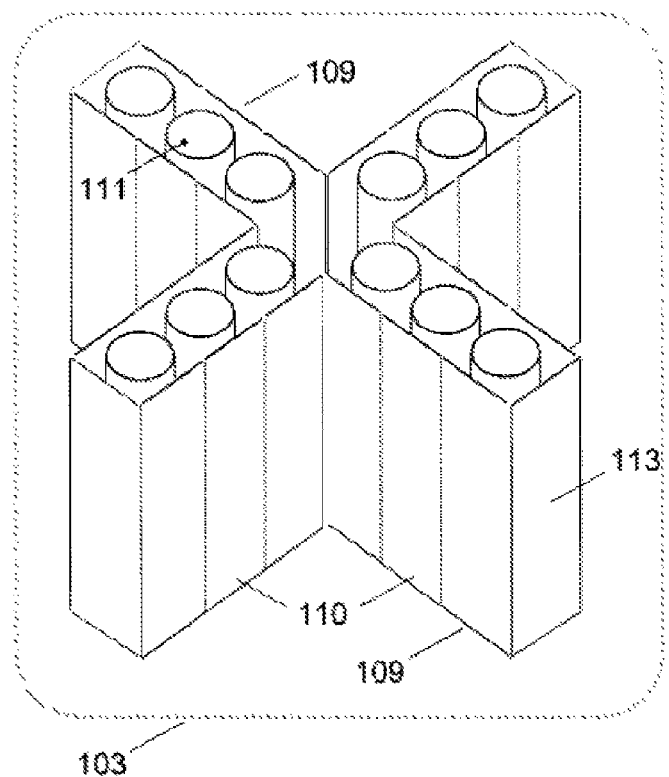

In a preferred embodiment, the receiver includes a plurality of single rows of tubes, intersecting approximately at the midpoint of each row, as illustrated in FIG. 2. In the figure, two single rows of tubes 111 are shown, which by intersecting form an "X" shape or a cross. Tubes 111 are provided in proximity to exterior surfaces 109 in such a way that at least two exterior surfaces 109 are in proximity to each tube 111. Each exterior surface 109 optionally comprises a plurality of panels 110. Again, additional external surfaces 113 are optionally provided in proximity to the endmost tubes in each row.

Figure 3:
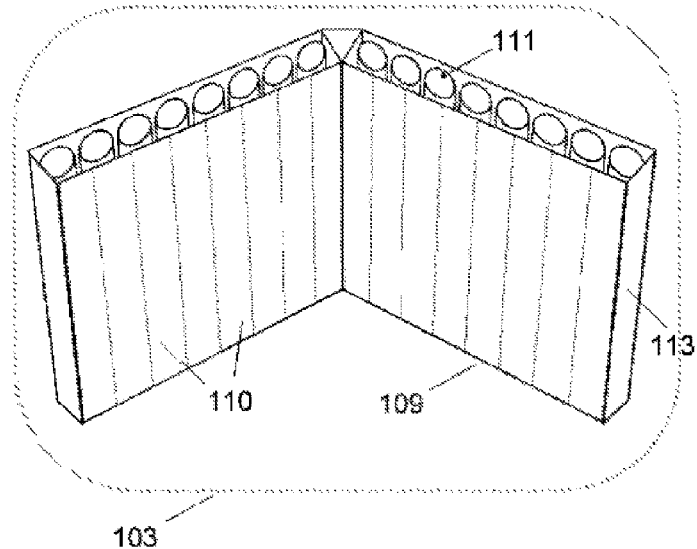

FIG. 3 illustrates an alternative preferred embodiment in which the single rows of tubes do not intersect but instead are joined at their ends. Determining whether the rows of tubes intersect or not, or where, is a function of optimizing the intensity and distribution of reflected solar radiation on the surface of the receiver, and resulting heat flux, while taking into account variables which may include, but not exhaustively, desired thermal output of the receiver, material characteristics including strength, heat transfer parameters and radiation absorptivity and emissivity, predictive weather and solar radiation data, heliostat placement and aiming or tracking accuracy, cost of receiver and heliostat materials and components, land availability, power purchase agreements, and differential electricity tariffs.

Figure 4:
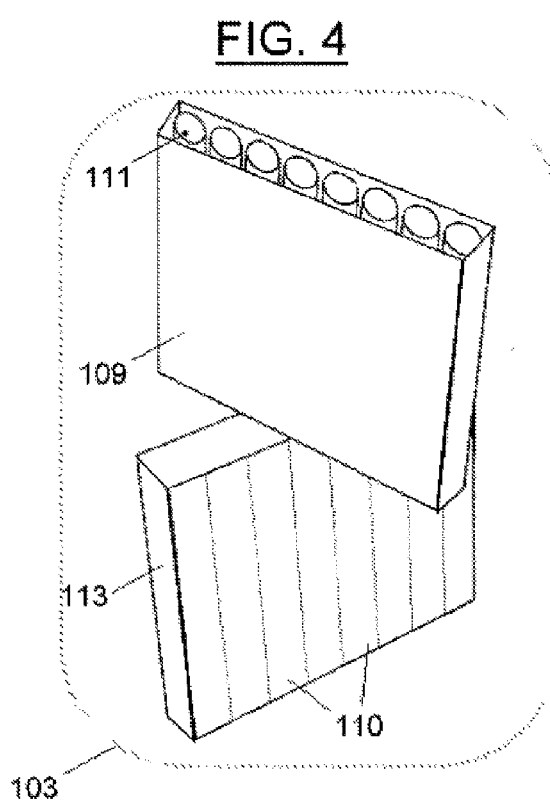

FIG. 4 illustrates another alternative preferred embodiment in which the single rows of tubes are separated vertically such that at least one row is higher than at least one other. For the sake of illustration only the top row is shown in cross-section but it should be understood that each of the rows includes tubes in proximity to each of which are provided external surfaces on at least two sides, as in the preceding embodiments.

The receiver may alternatively include a plurality of single rows of vertical tubes configured as arms of a star, where the arms of the star radiate outward from a central point or area. There can be any number of arms of the star. For example, the number of arms is in the range of three to ten. A receiver of this type with four arms would be the receiver shown earlier in FIG. 2 as there is no substantive difference between a receiver comprising two intersecting rows of tubes and a star-shaped receiver with four arms. The angles between each adjacent pair of arms of a star-shaped receiver can be equal all the way around the star, as in FIG. 5a, or unequal, as in FIG. 5b. Although not shown, the central area of the star can be constructed in a manner that improves the structural integrity of the receiver, for example, as a vertical cylinder (having a circular, polygonal, or other cross-sectional shapes) with the arms of the star radiating therefrom.

The number of arms and the angles between each pair of arms are determined through a design process that takes into account optimization of the intensity and distribution of reflected solar radiation on the surface of the receiver, and resulting heat flux, as described earlier with respect to determining the intersection point, if any, of rows of tubes. Such an optimization with respect to a receiver designed in accordance with any of the embodiments of the present invention can be performed by someone skilled in the art of solar field design. Therefore, the precise configuration in terms of the number, placement and relative positioning of the rows of tubes or arms of the star may be determined only when one skilled in the art comes to design a specific receiver for a specific solar field.

Further, the number of tubes or tube panels in each arm of the star should not be construed from the numbers shown in the accompanying figures; in an exemplary embodiment each arm of the star-shaped receiver is 6 meters long and each tube is approximately 2.5 centimeters in diameter, which means that each arm of the star can contain hundreds of tubes.

In yet another preferred embodiment, each single row of tubes (or arm of a star-shaped receiver) includes tubes arrayed in a meandering configuration and not in a straight line, as illustrated in FIG. 6. In this configuration, each tube 111 is directly exposed on at least two sides to the heat flux generated by reflected solar radiation impinging on the external surfaces 109.

In a receiver, tubes are generally not placed so close to one another that two adjacent tubes might come in contact with each other. As a result, some gap will exist between each pair of tubes in a single row or arm of a star-shaped receiver. Reflected solar radiation or heat flux will tend to 'leak' through this gap rather than be captured as thermal energy in the fluid. Therefore, each single row of tubes (or arm of a star-shaped receiver) may include tubes arrayed in a meandering configuration and not in a straight line, such that each tube substantially blocks the gap between each pair of neighboring tubes.

Referring now to FIG. 7, an arm 114 of a star-shaped receiver (remainder not shown) includes a single row of vertical tubes 111 positioned in such a meandering and gap-blocking configuration. The arm 114 is configured so that approximately 50 percent of the tubes 111 are offset to one side of the midline 115 of the arm 114 by less than one-half the diameter of the tubes, and the other approximately 50 percent of the tubes 111 are similarly offset to the other side of the midline 115. Furthermore, the linear distance LD between the centerpoint of each tube and that of an adjacent tube (in the dimension parallel to the midline or the row or arm, as illustrated), is less than or equal to the outside diameter D of each tube. The result of such a configuration is that the tubes 11 whose position is skewed to one side of the midline 115 will block the gap between adjacent tubes 111 on the other side of the midline 115, and vice versa, while at the same time each tube 111 is directly exposed on at least two sides to the heat flux generated by reflected solar radiation impinging on the external surfaces 109.

In another embodiment, mechanical support elements are added to the arms of a star-shaped receiver to provide added mechanical integrity, wind shear resistance and the like. FIG. 8 illustrates three types of mechanical supports that can be added. Support element 117 provides mechanical support across the external face of an arm of a star-shaped receiver or a single row of tubes. Support elements 118 also provides mechanical support across the external face of an arm of a star-shaped receiver or a single row of tubes. Strut element 119 may be interposed between two facing surfaces of adjacent arms of a star-shaped receiver. In alternative embodiments. Other support elements may be employed as known in the art.

The fluid in the receiver tubes may be water, steam, or a mixture of water and steam. Alternatively, the fluid in the receivers may be a molten salt. An example of a suitable material is a nitrate salt such as a combination of liquid sodium nitrate and potassium nitrate.

In other embodiments, a solar power tower system includes at least one tower and at least one set of heliostats, as described in detail, for example, in pending International Patent Application No. PCT/US08/58305, which is hereby incorporated by reference in its entirety. As discussed in PCT/US08/58305, each heliostat may track the sun to reflect light to a designated tower, and the tower designated for each heliostat can change depending on operating requirements and other conditions. In some embodiments a tower will stand within the boundaries of a field of heliostats, and in other embodiments at least one tower will not stand within the boundaries of a field of heliostats. In some embodiments the number of towers will be equal to the number of fields or sets of heliostats, and in other embodiments will not be equal.

A receiver, which uses received solar radiation and converts it to some useful form such as heat, is located at the top of a tower or at some other location, for example if an intermediate reflector is used to bounce light received at the top of a tower down to a receiver located at ground level.

Figure 9:
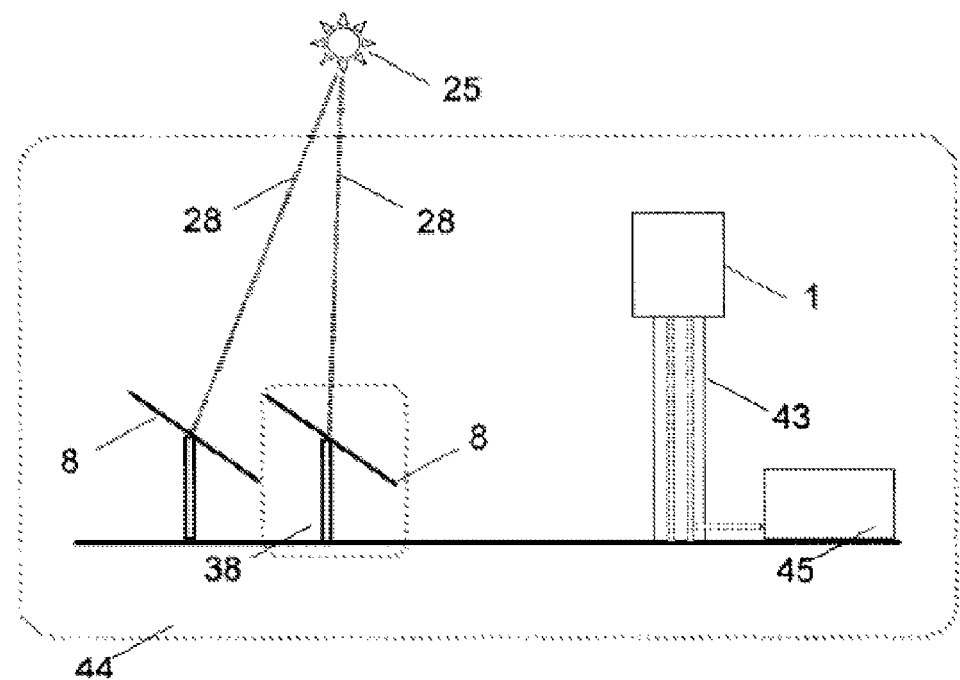
FIGS. 9 and 10 are diagrammatic elevation views of a plurality of heliostats and a central power tower in accordance with different embodiments of the invention.
Figure 10:
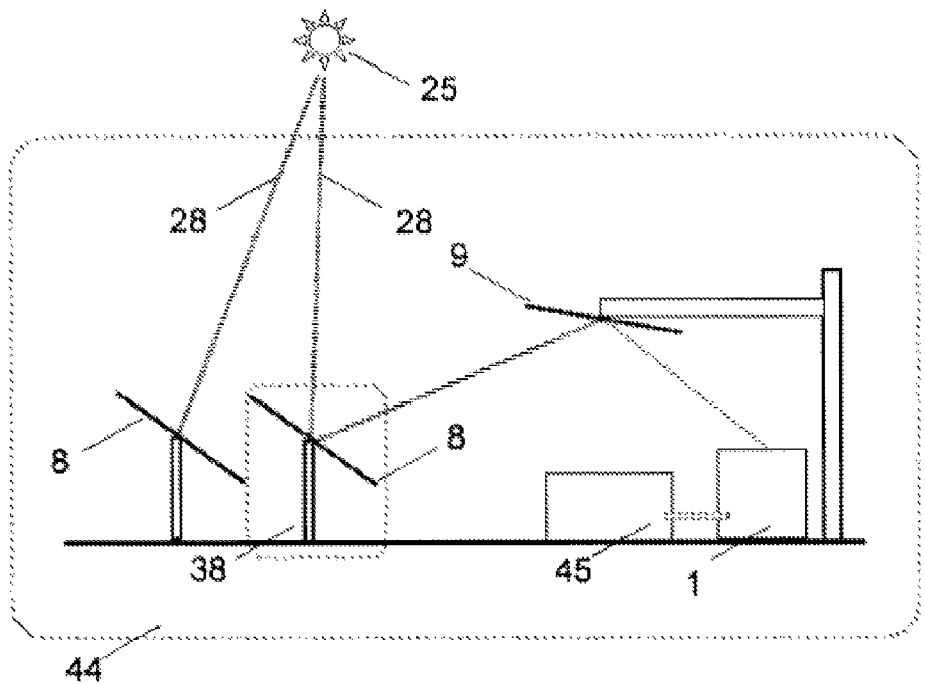

Referring again to the figures and in particular to FIG. 9, a solar power system 44 is provided in which heliostats 38 include mirrors 8 that reflect incident solar radiation 28 onto a receiver 1 in which a working fluid (not shown) is heated for later use in an electric power generating plant 45. The heliostat-mounted mirrors 8 are capable of tracking the apparent movement of the sun 25 across the sky each day in order to maintain the reflective focus in the direction of the receiver 1 as the angle of the incident radiation 28 changes. The receiver 1 is located atop a tower 43, or in an alternative embodiment, shown in FIG. 10, is located on the ground, and the heliostat-mounted mirrors 8 reflect solar radiation onto one or more secondary reflectors 9 which further reflect the radiation onto the receiver 1.

In an embodiment, a solar power tower system includes at least one receiver where the receiver includes at least one single row of tubes provided in proximity to exterior surfaces on at least two sides of each tube, upon which exterior surfaces reflected solar radiation impinges, as described in the preceding embodiments. The at least one receiver is used for heating a working fluid, including raising its temperature and/or changing its phase. In an example, the receiver is used for boiling water. In another example, the receiver is used for raising the temperature of water and/or steam. In another example, the receiver heats water or steam under supercritical conditions.

In some other embodiments, for every n+1 towers in a solar power tower system, one tower is used for the superheating of steam generated in the other n towers, and the solar receiver atop that tower is configured for superheating steam in terms of size, tube size and spacing, and external connections, and not for generating steam. Optimally, a steam turbine electric power plant is located in close proximity to the n+1th tower in order to minimize the extent and distance to which superheated steam is transported. If the steam turbine of the electric power plant includes a reheat cycle, then the receiver at the n+1$^{th}$ tower (also referred to herein as the "superheating receiver") will be used for both superheating the steam generated in the other n towers, and for reheating steam in the reheat cycle of the turbine. In the case that one or more of the receivers in the system operate at supercritical conditions, then the term "generation of steam" should be understood in its broader sense to include the heating of water/steam at supercritical conditions.

Figure 11:
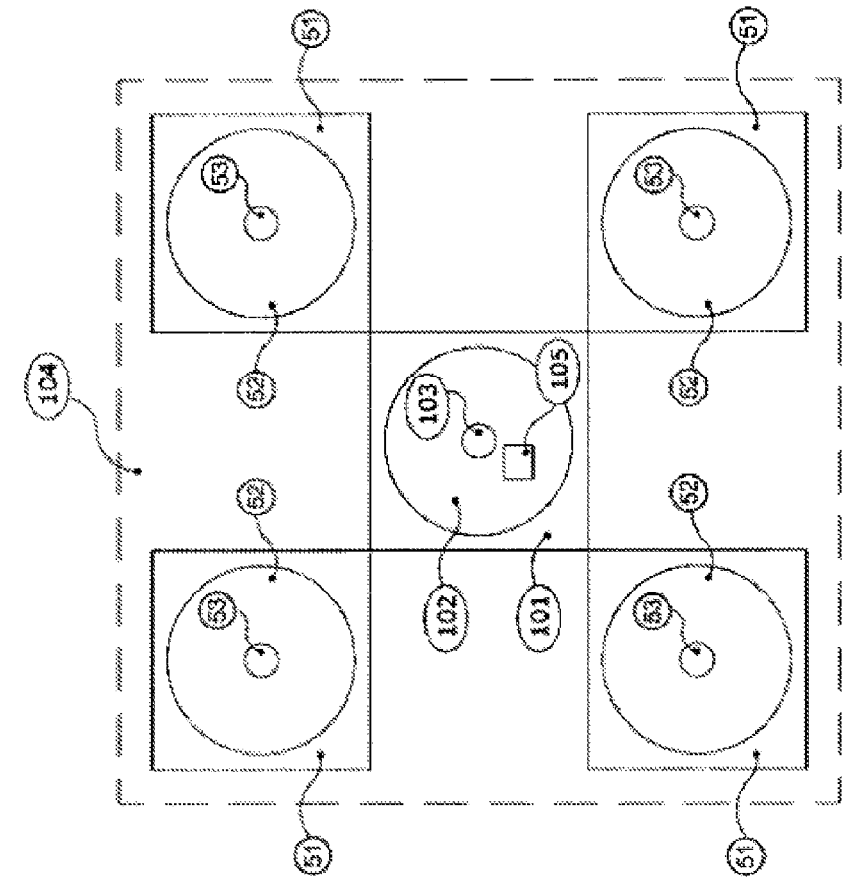

Referring now to FIG. 11, an embodiment is shown in which a solar system 104 comprises a plurality of solar fields 51 in each of which are located heliostat fields 52 and receivers 53. In each receiver 53, steam is generated from water at a pressure more than 10 bar, and steam is optionally superheated in a primary superheater section. In addition, another receiver 103 is provided, to which steam (not shown) generated and optionally partly superheated at the other receivers 53 is transported via pipelines, conduits or similar (not shown), and in which that steam is further superheated. Receiver 103 is located in an additional solar field 101 that includes a heliostat field 102. In an alternative embodiment heliostats in the heliostat fields 52 in the other solar fields 51 are capable of reflecting solar radiation also onto the superheating receiver 103 and are directed to do so by a control system if required to balance solar flux among receivers or to improve distribution of solar flux on the surface of superheating receiver 103. If not so directed, then those heliostats will reflect radiation onto one of the other receivers 53. A steam turbine electric plant 105 is provided in proximity to the superheating receiver 103 in order to minimize transport distance of steam at high temperatures, for example at temperatures above 540 degrees Celsius. The shape and spacing of the heliostat fields 52, 102 as shown in the figure are illustrative of an exemplary embodiment and in alternative embodiments, the heliostat fields can take other shapes including oval, elliptical, polygonal, the shape of an egg, the shape of a guitar pick, and the shape of a football. In other alternative embodiments the receivers may not be in the center of the heliostat fields but may be in another location, including locations south and west of center. In still other alternative embodiments, heliostat fields can be closer together than shown in the figure or arranged in a different geometric pattern.

Figure 12:
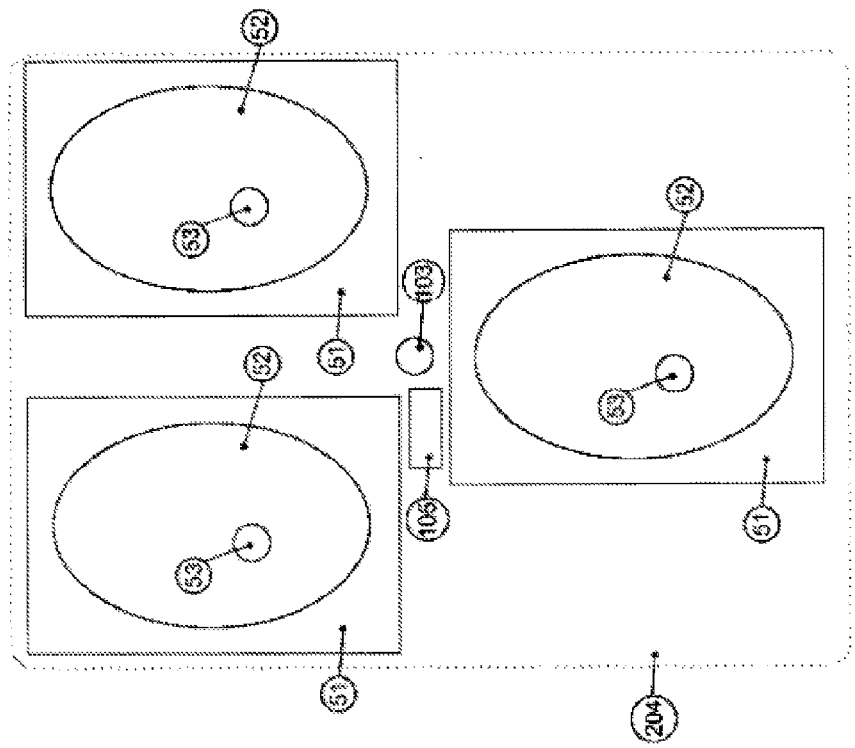
FIGS. 11 and 12 are diagrammatic views of systems of multiple solar towers according to preferred embodiments.

FIG. 12 shows another embodiment which is similar to the one illustrated in FIG. 11 except that superheating receiver 103 is not located within the boundaries of a heliostat field and in fact there is no defined heliostat field around the superheating receiver 103. Instead, subsets of heliostats in any or all of the heliostat fields 52 are directed to focus on the superheating receiver 103 as required by the operational needs of the system. Some of these heliostats may be directed to focus on superheating receiver 103 all of the time, some heliostats may be so directed only some of the time, and other heliostats may be never so directed, all in accordance with the operating needs of the system and any optimization that may be performed with respect to solar flux distribution and balance, electricity production or revenue generation. The system 204 includes a plurality of solar fields 51 in each of which are located heliostat fields 52 and receivers 53, but in this example the heliostat fields 52 are largely elliptical and the receivers 53 are located south and west of center. The skewed positioning of the receivers 53 from the center of the respective heliostat fields 52 is to minimize cosine losses, which occur because the effective reflection area of a heliostat is reduced by the cosine of one-half of the angle between incident radiation and reflected radiation. In the northern hemisphere, the sun's position in the southern sky during much of the day yields smaller angles of incidence and reflection of solar radiation for heliostats to the north of a receiver than for those to the south, and therefore lower cosine losses are incurred. Having more heliostats to the north of a receiver will therefore tend to utilize incident solar radiation more efficiently. Furthermore, when producing electricity for sale to an electric utility with differential electricity tariffs, afternoon electricity is frequently priced higher than morning electricity. In such a case it is beneficial to have more heliostats to the east of a receiver in order to utilize incident solar radiation more efficiently in the afternoon (when the sun's position in the western sky yields smaller angles of incidence and reflection for heliostats to the east of a receiver than for those to the west) even at the expense of yielding less efficient utilization in the morning when electricity is less valuable.

In a preferred embodiment, the superheating receiver of a multi-tower solar power tower system includes at least one single row of tubes provided in proximity to exterior surfaces on at least two sides of each tube, upon which exterior surfaces reflected solar radiation impinges, as described in previous embodiments herein.

In another preferred embodiment, the superheating receiver of a multi-tower solar power tower system includes a plurality of intersecting or non-intersecting single rows of tubes each provided in proximity to exterior surfaces on at least two sides of each tube, upon which exterior surfaces reflected solar radiation impinges, as described in previous embodiments herein.

Figure 5A:
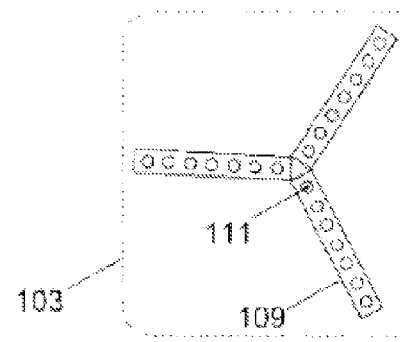
FIGS. 5a and 5b are cross-section views of star-shaped solar receivers showing arrangements of star arms and the interior arrangement of vertical tubes.
Figure 5B:
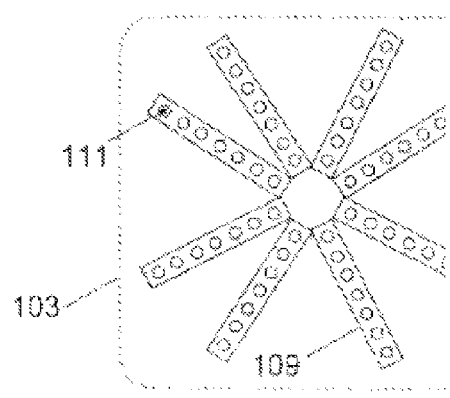

In an especially preferred embodiment, the superheating receiver is an x-shaped or star-shaped receiver as illustrated in FIG. 2, 5*a* or 5*b*.

In another especially preferred embodiment, balancing and optimizing of solar heat flux on the exterior surfaces of a superheating receiver as described in any of the preceding embodiments is performed by an operator and/or a computerized control system by selecting and aiming heliostats from at least one of the heliostat fields in a solar power tower system. Optimally, the balancing and optimizing of solar heat flux with respect to the superheating receiver will be assigned higher priority in the system's operating procedures or control programming than the balancing and optimizing of solar heat flux with respect to the other n out of n+1 receivers in the system.

Temperature differentials between surfaces of the pipes induced by heat flux differentials may cause one side of the pipe to expand more than another side of the pipe, thereby leading to thermal stress and/or bending of the pipe. Excessive bending may lead to failure of the pipe and/or the receiver. By controlling flux levels on opposite sides of the pipe, the amount of induced bending can be controlled. Accordingly, the balancing and optimizing of solar heat flux on opposing surfaces of the superheating pipes may be controlled such that thermal stress tending to bend the pipes remains below a specified level. This level may be determined, for example, from failure analysis based on the specifications of the pipe employed in the receiver. Alternatively, the specified level may be chosen based on given insulation and system conditions. Preferably, the control of the solar heat flux is optimized to minimize bending and thermal stresses of the solar receiver at all times.

In a preferred embodiment, the balancing and optimizing of solar heat flux with respect to the superheating receiver by selecting and aiming heliostats from at least one of the heliostat fields in a solar power tower system is performed on the basis of predictive weather data and historical performance parameters. In another preferred embodiment, it is performed on the basis of real-time optimization using at least one data feedback mechanism. Such a data feedback mechanism may include temperature measurements, stress and/or strain measurements from receiver pipes, flow measurements and pressure measurements, which can be taken at or in proximity to the superheating receiver or elsewhere, for example, at a turbine inlet. In an especially preferred embodiment, the selection of heliostats to reflect on the superheating receiver and the aiming of those heliostats on different parts of the receiver is performed at least once each day, at least once each hour, or at least three times each hour.

In a further especially preferred embodiment, a superheating receiver as described in any of the preceding embodiments is also used for reheating steam extracted from a turbine in a reheat cycle. The steam in the reheat cycle is generally at a lower pressure than the steam being superheated, and it is generally desirable to provide a lower level of heat flux to the reheat tubes than to the superheating tubes. This can be accomplished by having reheat tubes with a larger diameter than that of the superheating tubes, and/or by reflecting less solar radiation onto the external surface of the receiver corresponding to the reheat tubes. The latter objective can be accomplished by positioning the reheat tubes substantially at the endmost position of each arm of a star-shaped receiver, since nearly all of the reflected solar radiation directed at the receiver can be aimed at the external surfaces of the long dimensions of the arms rather than at the end panels. In alternative embodiments, the reheat tubes are positioned in a different location that can be designed or programmed to receiver a lower general level of heat flux.

Referring now to FIG. 13, a star-shaped receiver 103 with four arms (X-shaped), similar to that of FIG. 2, is shown, but which includes both superheating tubes 111 and reheating tubes 116, the latter having larger diameters than the former and being located at the endmost positions of each arm.

In a preferred embodiment, steam largely generated in the receivers of n out of the n+1 towers in a distributed power tower system at a pressure in the range 120 to 160 bar is superheated in the solar receiver of the n+1$^{th}$ tower to a temperature in the range 520 to 560 deg C., and steam transported from an outlet of a steam turbine with at least a single reheat cycle at a pressure of 12 to 28 bar is reheated therein to a like temperature. In an especially preferred embodiment, steam at a pressure in the range of 140 to 150 bar is superheated to a temperature in the range 540 to 550 deg C. and steam in the reheat cycle at a pressure in the range of 18 to 22 bar is also reheated to a like temperature. In another especially preferred embodiment, steam is superheated at a recommended inlet pressure and to the recommended inlet temperature of a provided steam turbine with at least a single reheat cycle as specified by the manufacturer of the turbine, and steam is reheated at a recommended pressure and to the recommended temperature of the reheat cycle of the turbine as specified by its manufacturer. In yet another especially preferred embodiment, the n+1$^{th}$ receiver is a star-shaped receiver as described in the preceding embodiments. In a further especially preferred embodiment, all of the receivers in the system are star-shaped receivers.

In another preferred embodiment, steam generated in at least one receiver in a solar power tower system at supercritical conditions of more than 220 bar is superheated to a temperature above 600 deg C., and steam transported from an outlet of a steam turbine with at least a single reheat cycle at a pressure of 16 to 20 bar is optionally reheated therein to a like temperature. In an especially preferred embodiment, the superheated steam is at supercritical conditions of more than 250 bar and is superheated to a temperature above 650 deg C. In another especially preferred embodiment the receiver is a star-shaped receiver as described in the preceding embodiments. In a further especially preferred embodiment, all of the receivers in the system are star-shaped receivers.

In another embodiment, a plurality of secondary reflectors is provided to reflect onto a receiver the solar radiation reflected from heliostats. In a preferred embodiment, the secondary reflectors are pivotable and can thereby be directed by an operator and/or a control system to balance solar heat flux across the exterior surfaces of a receiver. In another preferred embodiment, the secondary reflectors are movable, each in its entirety, on at least one of the axes of a horizontal plane, and are similarly directable by an operator or control system. In yet another preferred embodiment, the secondary reflectors are pivoted and/or moved in order to balance solar heat flux among and across the exterior surfaces of a receiver and to minimize the respective angles of reflection between incoming and re-reflected radiation for each secondary reflector. Referring to FIG. 14, an example of a secondary reflector with pivoting and moving capabilities is shown. A secondary reflector 9 is mounted on a wheeled frame 151, which moves freely around the receiver 103, on track 150, in response to control instructions. The secondary reflector 9 is also capable of pivoting in two axes at the attachment point (not shown) to the wheeled frame.

The solar receiver of the present invention may also be combined with cylindrical solar receiver designs, such as that shown in U.S. Pat. No. 6,931,851 to Litwin, which is hereby incorporated by reference in its entirety. For example, a standard drum-shaped (or annular cylindrical) solar receiver may be provided on the same tower or in the same vicinity as a star-shaped receiver, but displaced therefrom. Some of the heliostats in a heliostat field may thus be configured to reflect radiation onto the drum-shaped receiver while other heliostats may be configured to reflect radiation onto the star-shaped receiver.

An example of such a receiver combination is show in FIG. 15. A drum-shaped receiver 201 with pipes carrying a working fluid is offset from a star-shaped receiver 103. Such a configuration may be employed in a common solar power tower, whereby the drum-shaped receiver 201 is vertically displaced from the star-shaped receiver 103. The drum-shaped receiver 201 may be located higher in the solar power tower than the star-shaped receiver 103. The center of the star-shaped receiver 103 may be aligned with the center of the drum-shaped receiver 201 such that the two receivers are coaxial. However, it is not required that the two receivers be coaxial. Thus, in an alternative configuration, the receivers may be horizontally displaced with respect to each other so as to be located next to each other at the same height in the solar power tower.

Further, the pipes from the star-shaped receiver 103 may be connected to the pipes of the drum-shaped receiver 201. For example, an outlet of the drum-shaped receiver 201 may be directly connected to an inlet of the star-shaped receiver 103 by way of a manifold or a header. In an alternative arrangement, the outlet of the drum-shaped receiver 201 may be connected to the inlet of the star-shaped receiver 103 by way of a steam separation drum.

The star-shaped receiver 103 may have a differentiated function from the receiver 201. In particular, the drum-shaped receiver 201 may constitute a steam generating section with the pipes contained therein being configured for temperatures and pressures associated with steam generation. The star-shaped receiver 103 may constitute a superheating section with pipes contained therein being configured for temperatures and pressures associated with superheating of steam.

In another embodiment, the concept of combining drum-shaped and star-shaped receivers is extended to the integration of the arms of the star-shaped receiver with a central receiver portion. Such an example is shown in FIG. 16. A central drum-shaped receiver portion 203 has a plurality of tubes or pipes 211 provided between headers 213a and 213b in a substantially annular arrangement. Pipes 209 may be provided in a linear parallel arrangement between headers 207a and 207b so as to form a single column. The single column effectively forms an arm 205a projecting from a surface of the central receiver portion 203 along a radial direction with respect to a central axis of the central receiver portion 203. Thus, radiation may be incident on arm 205a from at least two directions in a manner similar to the star-shaped receiver 103 discussed in other embodiments. Multiple arms, such as arm 205b, may be provided on the surface of the central receiver portion 203 in a manner similar to arm 205a. Pipes 209 may be configured to superheat steam generated by pipes 211, for example. Headers 207a, 207b and headers 213a, 213b may be mechanically connected so as to support the tubes 209.

Figure 18:
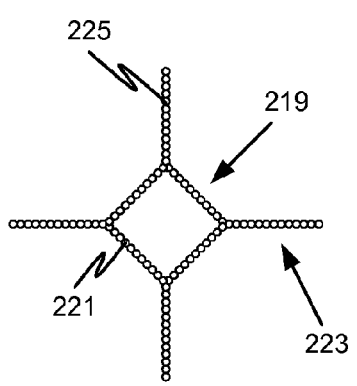
FIG. 18 is a plan view of a panel-less solar receiver with a central square-shaped receiver portion with arms radially projecting from the corners thereof.

It is noted that the particular shape for the central receiver portion is not limited to the substantially annular shape illustrated in FIG. 16. Other shapes are also possible according to one or more contemplated embodiments. For example, the central receiver may be a panel-less central receiver portion 219 having a polygonal shape (in plan view) with pipes 221 arranged around a perimeter thereof, as illustrated in FIG. 18. The polygonal shape may be a triangle, square (as illustrated), rectangle, or any other polygonal shape. Arms 223 with a parallel arrangement of pipes 225 may extend radially from the corners of the central receiver portion 219. Alternately, the arms 223 may be arranged at different angles (with respect to the diagonals of the polygon) or at different locations on the surface of the polygon to take advantage of reflected radiation conditions.

Figure 17:
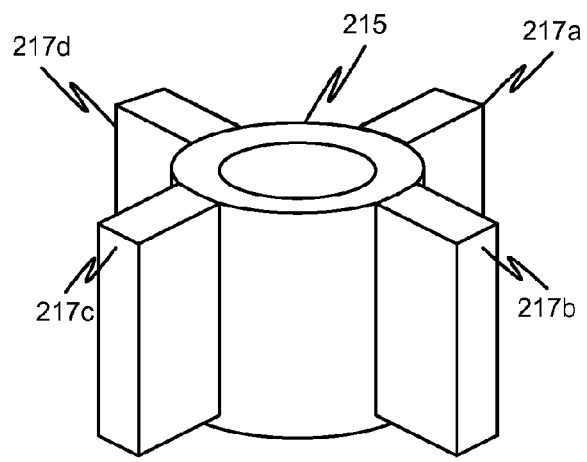
FIG. 17 is an oblique projection of a solar receiver with a central drum-shaped receiver portion with arms radially projecting therefrom.
Figure 19:
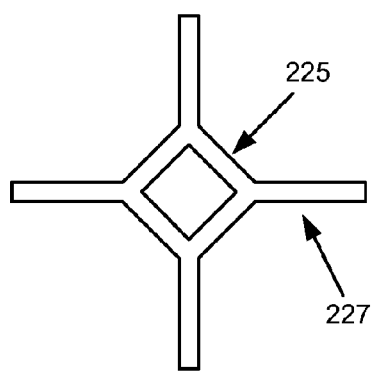
FIG. 19 is a plan view of a solar receiver with a central square-shaped receiver portion with arms radially projecting from the corners thereof.

As shown in FIG. 16, receiver portions 203 and 205a/205b lack any panel surfaces. Receiver portions 219 and 223 of FIG. 18 also lack any panel surfaces. Thus, radiation reflected by heliostats onto the receiver portions is directly incident on the exterior surfaces of the pipes of the receiver portions. In alternative embodiments, panels may be placed over the external surfaces of the pipes such that radiation reflected by the heliostats is incident thereon. Thus, heat is transferred from the panels to the pipes in the receiver. Such an exemplary embodiment is shown in FIG. 17. As shown therein, central annular receiver portion 215 has panel arms 217a-217d extending radially from the exterior surface of the receiver portion 215. An alternative configuration is shown in FIG. 19, which illustrates a central square receiver 225 with panel arms 227. Of course, it is also possible that only a portion of the solar receiver may have panel surfaces according to one or more contemplated embodiments.

Certain features of the invention may sometimes be used to advantage without a corresponding use of other features. While specific embodiments of the invention have been shown and described in detail to illustrate the application of the principles of the invention, it will be understood that the invention may be embodied otherwise without departing from such principles.

Although many of the embodiments illustrated have absorber panels over the boiler tubes, the external absorber panels are not essential and can be omitted. That is, all of the embodiments that include them are accompanied by embodiments without this feature.

It is, therefore, apparent that there is provided, in accordance with the present invention, a system and method for solar energy conversion. While this invention has been described in conjunction with a number of embodiments, it is evident that many alternatives, modifications, and variations would be or are apparent to those of ordinary skill in the applicable arts. Accordingly, Applicants intend to embrace all such alternatives, modifications, equivalents, and variations that are within the spirit and scope of this invention.

We claim:

1. A solar energy receiver, comprising:
a first receiver portion having a first configuration and a second receiver portion having a second configuration, the first configuration including at least one flat side in plan view;
the first receiver portion being attached to the second receiver portion to provide support to the second, the second configuration including generally planar surfaces oppositely disposed and outwardly facing;
the first and second receiver portions being configured to convey separate heat transfer fluid flows that are fluidly isolated from each other.

2. The receiver of claim 1, wherein the first receiver portion has a piecewise polygonal shape or a square shape in plan view, having a central axis, and the second receiver portion includes multiple segments that project from the first receiver portion in a radial direction with respect to the central axis.

3. A solar energy conversion system, comprising:
a receiver with a first heat transfer fluid channel, the receiver having a pair of reflected-solar-energy-receiving sides configured to receive reflected solar energy, each reflected-solar-energy-receiving side presenting an external surface facing in a direction opposite to that of the external surface of the other reflected-solar-energy-receiving side, the first heat transfer fluid channel being arranged between the pair of reflected-solar-energy-receiving sides such that a heat transfer fluid carried in the first heat transfer fluid channel is heated by solar energy reflected onto both of the reflected-solar-energy-receiving sides; and
a heliostat field configured to reflect solar energy onto both of the reflected-solar-energy-receiving sides at the same time during the course of a day such that a thermal stress tending to bend the first heat transfer fluid channel toward either side remains below a specified level.

4. The system of claim 3, wherein the receiver has a plate-shaped element, the reflected-solar-energy-receiving sides being opposite sides of the plate-shaped element.

5. The system of claim 3, wherein the receiver has a bank of pipes forming a plate-shaped element, the reflected-solar-energy-receiving sides being opposite sides of the pipes.

6. The system of claim 3, wherein the receiver has a second heat transfer fluid channel with an outwardly facing surface arranged so as to receive energy from the heliostat field and an inwardly facing surface arranged so as to face away from the heliostat field.

7. The system of claim 3, wherein the receiver has a second heat transfer fluid channel with an outwardly facing surface arranged so as to receive energy from the heliostat field and an inwardly facing surface arranged so as to face away from the heliostat field, wherein the first heat transfer channel is provided along one of multiple plate-shaped elements extending from the second heat transfer fluid channel.

8. The system of claim 3, wherein the receiver has a second heat transfer fluid channel with an outwardly facing surface arranged so as to receive energy from the heliostat field and an inwardly facing surface arranged so as to face away from the heliostat field, wherein the first heat transfer channel is provided along one of multiple plate-shaped elements extending from the second heat transfer fluid channel and wherein the first heat transfer fluid channel is configured to operate at a higher temperature than the second heat transfer fluid channel.

9. The solar energy conversion system of claim 3, further comprising, one or more controllers coupled to the heliostat field and configured to select and aim heliostats in the heliostat field to balance solar heat flux on the pair of reflected-solar-energy-receiving sides.

10. A solar energy conversion system, comprising:
a receiver provided in a solar tower, the receiver including first and second sets of pipes that convey heat transfer fluid,
the first set of pipes being interconnected for parallel flow of heat transfer fluid therethrough and arranged so as to define a partially circular shape in a top-down plan view,
the second set of pipes being interconnected for parallel flow of heat transfer fluid therethrough, the pipes of the second set being linearly arranged in the top-down plan view so as to define a plate-shaped structure, the plate-shaped structure having a pair of opposite reflected-solar-energy-receiving sides formed by outwardly-facing opposite surface portions of each pipe of the second set, each of the reflected-solar-energy sides being configured to receive reflected solar energy;
a heliostat field around the solar tower, the heliostat field being configured to simultaneously reflect solar energy onto both reflected-solar-energy-receiving sides of the plate-shaped structure during the course of a day such that a thermal stress tending to bend the second set of pipes toward either of the opposite reflected-solar-energy-receiving sides remains below a specified level.

11. The solar energy conversion system of claim 10, further comprising, one or more controllers coupled to the heliostat field and configured to select and aim heliostats in the heliostat field to balance solar heat flux on the pair of reflected-solar-energy-receiving sides of the plate-shaped structure.

12. The system of claim 10, wherein the first set of pipes has a header portion, the header portion being mechanically connected to the second set of pipes to support the second set of pipes.

13. A solar energy receiver, comprising:
a first receiver portion having a first configuration and a second receiver portion having a second configuration, the first configuration including at least a partially circular section in plan view;
the first receiver portion being attached to the second receiver portion to provide support to the second, the second configuration including generally planar surfaces oppositely disposed and outwardly facing;
the first and second receiver portions being configured to convey separate heat transfer fluid flows that are fluidly isolated from each other.

14. The receiver of claim 13, wherein the first receiver portion has a piecewise cylindrical shape or a cylindrical shape, having a central axis, and the second receiver portion includes multiple segments that project from the first receiver portion in a radial direction with respect to the central axis.

15. The receiver of claim 13, wherein the first and second portions are fluidly coupled to respective header pipes, the respective header pipes being mechanically connected such that the first receiver portion provides mechanical support to the second receiver portion.

16. The receiver of claim 13, wherein the first portion is connected to a source of liquid which is conveyed thereby and the second portion is connected to a source of steam which is conveyed thereby.

17. The receiver of claim 13, wherein the first receiver portion has a cylindrical shape, having a central axis, and the second receiver portion includes three or four segments or tube banks that project from the first receiver portion in a radial direction with respect to the central axis.

18. The receiver of claim 13, further comprising a third receiver portion having a third configuration, the third configuration including generally planar surface oppositely disposed and outwardly facing, the first, second and third receiver portions being configured to convey separate heat transfer fluid flows that are fluidly isolated from each other.

19. The receiver of claim 13, wherein the second receiver portion includes a third receiver portion, the third receiver portion being configured to convey separate a heat transfer fluid flow that is fluidly isolated from other heat transfer fluid flows of the second receiver portion.

* * * * *